(12) United States Patent
Voit et al.

(10) Patent No.: US 12,719,308 B2
(45) Date of Patent: Aug. 25, 2026

(54) GENERATING VERIFIABLE POWER LINE SUSTAINABILITY DATA

(71) Applicant: Cisco Technology, Inc., San Jose, CA (US)

(72) Inventors: Eric A Voit, Bethesda, MD (US); Gary Stuebing, North Myrtle Beach, SC (US)

(73) Assignee: Cisco Technology, Inc., San Jose, CA (US)

( * ) Notice: Subject to any disclaimer, the term of this patent is extended or adjusted under 35 U.S.C. 154(b) by 510 days.

(21) Appl. No.: 18/187,237

(22) Filed: Mar. 21, 2023

(65) Prior Publication Data

US 2024/0322596 A1 Sep. 26, 2024

(51) Int. Cl.
*H02J 13/12* (2026.01)
*G05B 15/02* (2006.01)
(Continued)

(52) U.S. Cl.
CPC .............. *H02J 13/12* (2026.01); *G06Q 50/06* (2013.01); *H02J 13/1337* (2026.01); *G05B 15/02* (2013.01); *G06Q 10/10* (2013.01)

(58) Field of Classification Search
None
See application file for complete search history.

(56) References Cited

U.S. PATENT DOCUMENTS 7,123,994 B2 * 10/2006 Weik ........................ H02J 3/144 700/286
8,239,073 B2 * 8/2012 Fausak .................... G01D 4/002 700/286

(Continued)

FOREIGN PATENT DOCUMENTS

KR 20100131775 A 12/2010

OTHER PUBLICATIONS

Sabt, M., “Trusted Execution Environment: What it is, and What it is Not”, 2015, 2015 IEEE Trustcom/BigDataSE/ISPA. (Year: 2015).*

(Continued)

*Primary Examiner* — Mohammad Ali
*Assistant Examiner* — Kelvin Booker
(74) *Attorney, Agent, or Firm* — Rutan & Tucker, LLP; Ravi Mohan; Marc A. McClain

(57) ABSTRACT

Systems and methods for generating verifiable power line sustainability data are disclosed herein. In many embodiments, a device includes a processor, a memory commutatively coupled to the processor, a communication port coupled with a second device, and a smart meter logic configured to execute within a trusted execution environment. Power source data may be received through the communication port. The power source data may be processed such as attesting to the validity of the data through a trusted execution environment. The received power source data may be communicated to energy-consuming devices and formatted to allow the energy-consuming devices to adjust their energy consumption in response to a metric, such as a sustainability metric, within the power source data. Sustainability metrics can include a power source carbon footprint, greenhouse gas mix values, and/or other indicators. Power use decisions for energy-consuming devices can be made in response to these verified sustainability metrics.

20 Claims, 9 Drawing Sheets

(51) Int. Cl.
*G06Q 10/10* (2023.01)
*G06Q 50/06* (2024.01)
*H02J 13/13* (2026.01)

(56) References Cited

U.S. PATENT DOCUMENTS 8,560,134 B1* 10/2013 Lee .................... G06Q 50/06 700/28
8,892,540 B2* 11/2014 Walker ............ G06F 16/24578 707/706
9,218,632 B2* 12/2015 Venkatakrishnan .. G06F 1/3203
9,429,974 B2* 8/2016 Forbes, Jr. ............... H02J 3/14
9,438,041 B2* 9/2016 Roy ..................... G06Q 50/06
9,491,172 B2* 11/2016 Dietrich ................. G06F 21/57
9,621,547 B2* 4/2017 Sharaga ............. H04L 63/0869
9,678,522 B2* 6/2017 Forbes, Jr. ............ G01D 4/004
10,169,574 B2* 1/2019 Nesher ................... G06F 21/53
10,397,005 B2* 8/2019 Brickell ................. H04L 9/302
11,561,565 B2* 1/2023 Forbes, Jr. ........... H02J 3/0012
11,740,602 B2* 8/2023 Kim .................... G05B 19/042 700/286
2003/0069743 A1 4/2003 Nordrum
2005/0187727 A1* 8/2005 Weik ................ H02J 13/00002 700/291
2005/0192713 A1* 9/2005 Weik ..................... H02J 3/008 700/286
2010/0274810 A1* 10/2010 Walker ............... G06F 16/9535 707/E17.014
2011/0320054 A1* 12/2011 Brzezowski .......... G06Q 50/06 700/291
2012/0029897 A1* 2/2012 Cherian ........... H02J 13/00028 703/18
2012/0173444 A1* 7/2012 Zik ...................... G06Q 10/10 705/317
2012/0215369 A1* 8/2012 Desai .................... G06Q 50/06 700/291
2012/0245749 A1* 9/2012 Littrell ................... H02J 3/144 700/291
2013/0110299 A1* 5/2013 Meyerhofer ............ G06N 5/04 713/320
2013/0345884 A1* 12/2013 Forbes, Jr. ........ H02J 13/00028 700/286
2013/0346247 A1* 12/2013 Bash ..................... G06Q 30/00 705/26.61
2014/0018969 A1* 1/2014 Forbes, Jr. ........ H02J 13/00004 700/295
2014/0303795 A1* 10/2014 Hommelberg ......... G06Q 10/00 700/286
2015/0073609 A1* 3/2015 Forbes, Jr. ............... H02J 3/14 700/286
2015/0081374 A1 3/2015 Sahlstrom et al.
2015/0105931 A1* 4/2015 Forbes, Jr. ............... H02J 3/14 700/297
2015/0142201 A1* 5/2015 Forbes, Jr. ............... H02J 3/14 700/297
2015/0261950 A1* 9/2015 Schulz ................. H04L 9/0827 726/22
2015/0263855 A1* 9/2015 Schulz ................. H04L 9/0827 713/155
2015/0264021 A1* 9/2015 Schulz ............... H04L 63/0414 713/170
2015/0280436 A1* 10/2015 Weckx ............. H02J 13/00034 700/295
2016/0012460 A1* 1/2016 Kruglick ............... G01D 4/002 705/14.1
2016/0126734 A1* 5/2016 Price ..................... G06Q 50/06 700/291
2016/0142212 A1* 5/2016 Sarangdhar .......... H04L 9/3234 713/156
2016/0148113 A1* 5/2016 Kolter ..................... G06N 7/01 706/12
2016/0182499 A1* 6/2016 Sharaga ................. G06F 21/82 713/156
2016/0274556 A1* 9/2016 Murphy ................ G05B 15/02
2019/0137553 A1* 5/2019 Mehrhoff ............... G06F 17/40
2019/0140828 A1* 5/2019 Wheeler .............. H04L 9/3242
2019/0346870 A1* 11/2019 Forbes, Jr. .......... G06Q 10/063
2020/0374605 A1 11/2020 Snook, II et al.
2021/0021533 A1* 1/2021 Guim Bernat ........ H04L 47/746
2021/0226450 A1* 7/2021 Goergen ................ H04L 12/10
2022/0197773 A1* 6/2022 Butler ............... H04N 21/2223
2022/0352715 A1* 11/2022 Schandert ............ H02J 3/0075
2023/0251701 A1* 8/2023 Chamberlin .......... G06F 1/3203 713/320
2024/0323090 A1* 9/2024 Pignataro .............. G06Q 50/06

OTHER PUBLICATIONS

Sun et al., "A Design and Verification Methodology for a TrustZone Trusted Execution Environment", Jan. 2020, IEEE Access. (Year: 2020).*

Valadares et al., "Formal Verification of a Trusted Execution Environment-Based Architecture for IoT Applications", Dec. 2020, IEEE Internet of Things Journal, vol. 8, No. 23, Dec. 1, 2021. (Year: 2020).*

Lemay et al., "Unified Architecture for Large-Scale Attested Metering", 2007, Proceedings of the 40th Hawaii International Conference on System Sciences. (Year: 2007).*

Ekberg, J., "Securing Software Architectures for Trusted Processor Environments", May 2013, Aalto University School of Science Computer Science and Engineering Data Communications Software. (Year: 2013).*

Karopoulos et al., "Towards trusted metering in the smart grid", Jun. 2017, 2017 IEEE 22nd International Workshop on Computer Aided Modeling and Design of Communication Links and Networks (CAMAD). (Year: 2017).*

Agrawal, U., "Securing Future Internet of Things Devices for Power Grid Through Trusted Execution Environment", May 2017, Master of Science in Computer Science Washington State University School of Electrical Engineering and Computer Science. (Year: 2017).*

Sebastian et al., "DER-TEE: Secure Distributed Energy Resource Operations Through Trusted Execution Environments", Aug. 2019, IEEE Internet of Things Journal, vol. 6, No. 4, Aug. 2019. (Year: 2019).*

Karakashev et al., "Making Renewable Energy Certificates Efficient, Trustworthy, and Anonymous", 2020, 2020 IEEE International Conference on Communications, Control, and Computing Technologies for Smart Grids (SmartGridComm). (Year: 2020).*

* cited by examiner

200B
DISTRIBUTED INTELLIGENCE WITH TRADITIONAL APPROACH
210
CENTRAL SYSTEM
250
210
CENTRAL SYSTEM
260
PEER-TO-PEER COMMUNICATIONS
270
220
270
220
270
270
220
270
220
270
FIELD
CENTRAL OFFICE
MICROGRID LEADS

300
FEEDER
310
BRANCH
330
BRANCH
330
BRANCH
330
BRANCH
330
MICROGRID
270
MICROGRID
270
L
MICROGRID LEADS
MICROGRID LEAD HOSTING ELECTED COORDINATION SERVICE LEADER
INTRA-LAYER PEER-TO-PEER COMMUNICATIONS
INTRA-LAYER COORDINATION SERVICE COMMUNICATIONS 400
405
410N
910
CONFIDENTIAL COMPUTING PROCESSOR
TEE
960
APPLICATION
WHEN FLOW BACK
TO MICROGRID
ATTEST
LOCAL DATA
OVER LAST 5 MIN
950
FLOW
METER
SMART METER
PHYS
410A
450
270
MICROGRID LEAD
810
CONFIDENTIAL COMPUTING PROCESSOR
860
TEE
APPLICATION
ATTEST
AGGREGATE OVER
LAST 5 MIN
FLOW
METER
850
310
ATTEST

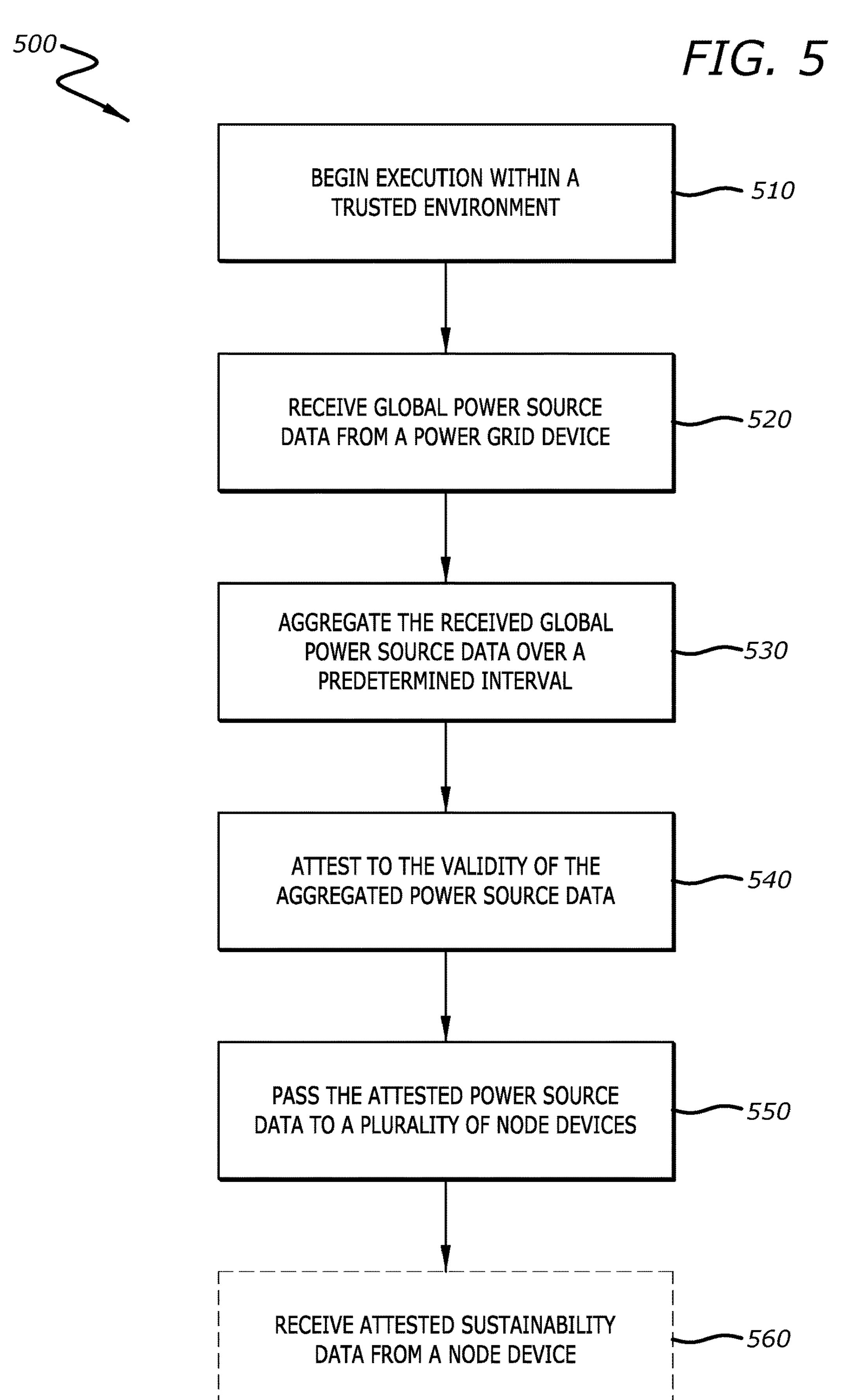
500
FIG. 5
BEGIN EXECUTION WITHIN A TRUSTED ENVIRONMENT
510
RECEIVE GLOBAL POWER SOURCE DATA FROM A POWER GRID DEVICE
520
AGGREGATE THE RECEIVED GLOBAL POWER SOURCE DATA OVER A PREDETERMINED INTERVAL
530
ATTEST TO THE VALIDITY OF THE AGGREGATED POWER SOURCE DATA
540
PASS THE ATTESTED POWER SOURCE DATA TO A PLURALITY OF NODE DEVICES
550
RECEIVE ATTESTED SUSTAINABILITY DATA FROM A NODE DEVICE
560

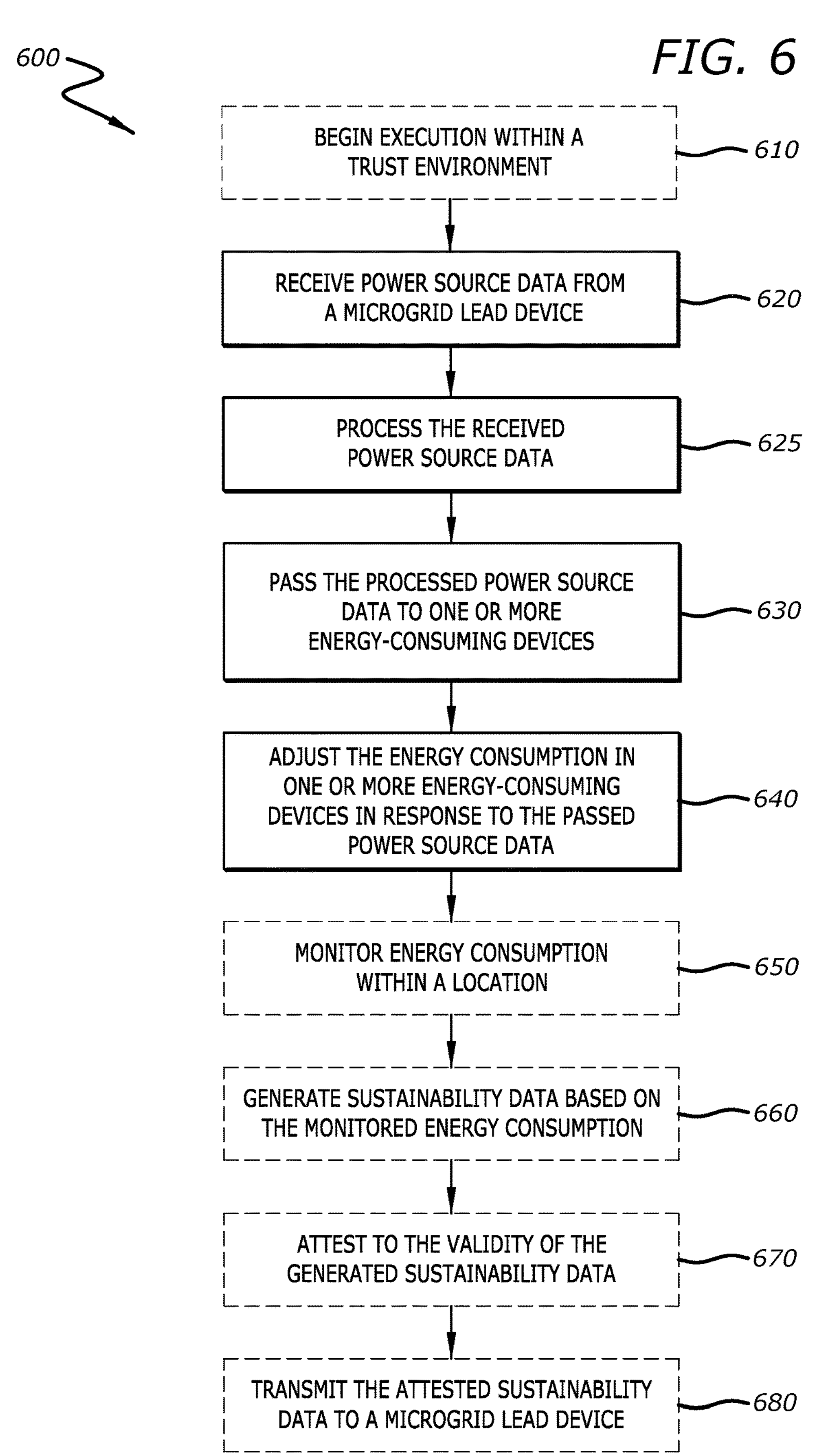
600
FIG. 6
BEGIN EXECUTION WITHIN A TRUST ENVIRONMENT
610
RECEIVE POWER SOURCE DATA FROM A MICROGRID LEAD DEVICE
620
PROCESS THE RECEIVED POWER SOURCE DATA
625
PASS THE PROCESSED POWER SOURCE DATA TO ONE OR MORE ENERGY-CONSUMING DEVICES
630
ADJUST THE ENERGY CONSUMPTION IN ONE OR MORE ENERGY-CONSUMING DEVICES IN RESPONSE TO THE PASSED POWER SOURCE DATA
640
MONITOR ENERGY CONSUMPTION WITHIN A LOCATION
650
GENERATE SUSTAINABILITY DATA BASED ON THE MONITORED ENERGY CONSUMPTION
660
ATTEST TO THE VALIDITY OF THE GENERATED SUSTAINABILITY DATA
670
TRANSMIT THE ATTESTED SUSTAINABILITY DATA TO A MICROGRID LEAD DEVICE
680

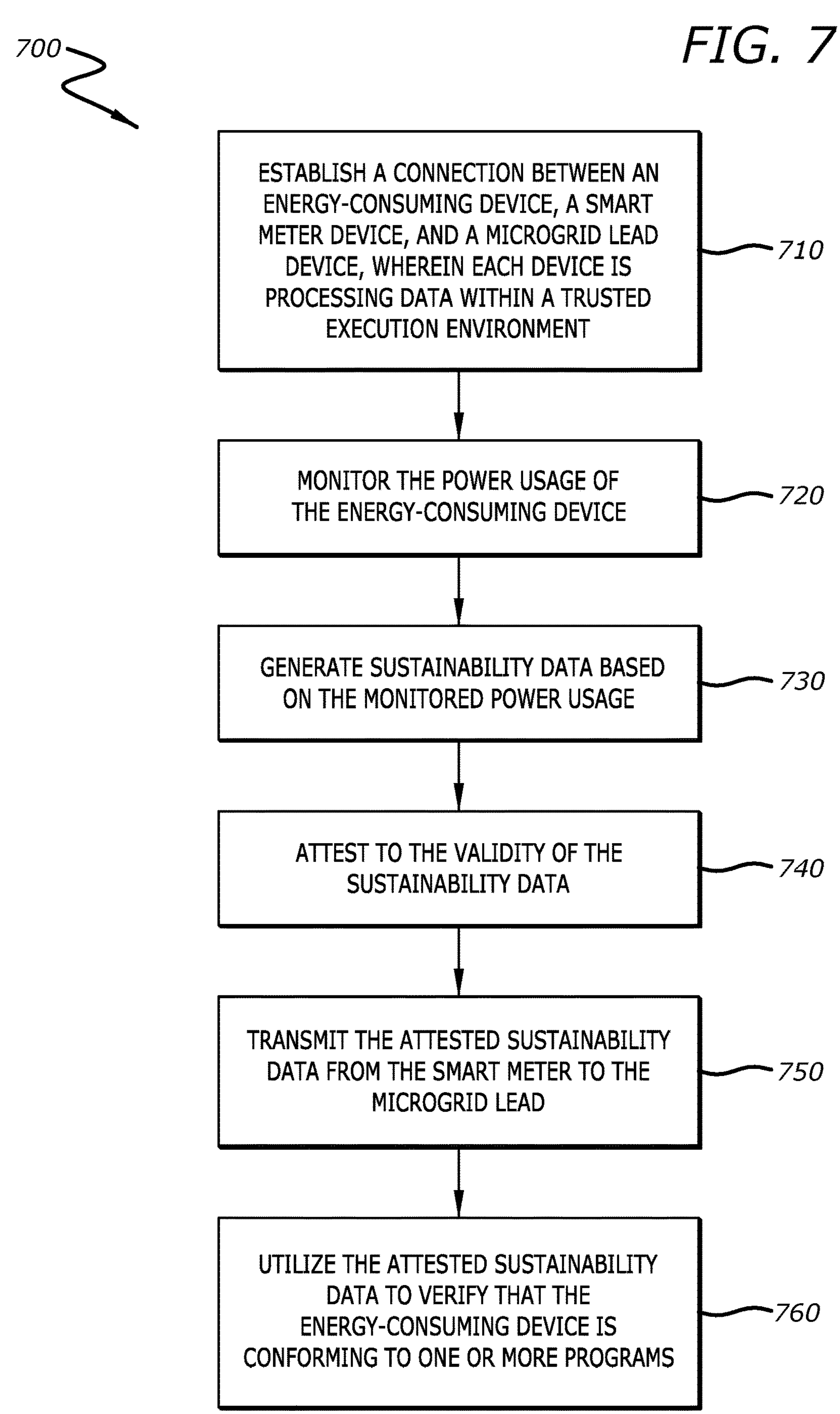
FIG. 7
700
ESTABLISH A CONNECTION BETWEEN AN ENERGY-CONSUMING DEVICE, A SMART METER DEVICE, AND A MICROGRID LEAD DEVICE, WHEREIN EACH DEVICE IS PROCESSING DATA WITHIN A TRUSTED EXECUTION ENVIRONMENT
710
MONITOR THE POWER USAGE OF THE ENERGY-CONSUMING DEVICE
720
GENERATE SUSTAINABILITY DATA BASED ON THE MONITORED POWER USAGE
730
ATTEST TO THE VALIDITY OF THE SUSTAINABILITY DATA
740
TRANSMIT THE ATTESTED SUSTAINABILITY DATA FROM THE SMART METER TO THE MICROGRID LEAD
750
UTILIZE THE ATTESTED SUSTAINABILITY DATA TO VERIFY THAT THE ENERGY-CONSUMING DEVICE IS CONFORMING TO ONE OR MORE PROGRAMS
760

GENERATING VERIFIABLE POWER LINE SUSTAINABILITY DATA

The present disclosure relates to power delivery monitoring. More particularly, the present disclosure relates to securely verifying one or more sustainability metrics provided by the power grid.

BACKGROUND

The use of a zonal structure for energy markets across the globe is expanding. These zones can be divided into power grid partitions. Each partition can serve a number of locations with a power inflow and provide a method of outflow for those locations that produces surplus power, such as locations with solar panels, for example. Often, there can be a "lead" or some location or device that acts as a coordinator or access point for a particular power grid partition.

To facilitate various decisions about the power grid partition, the lead may receive data related to the environment in which it operates. For example, the lead may receive data related to the amount of power that is being inflowed or outflowed. Other data can be tracked such as dates, times, and historical records such that decisions may be made by the lead to provide a more efficient operation.

In some environments, a series of homes may be partitioned together as a cluster within the power grid with a microgrid lead device configured to provide access and configuration to the larger power grid. These homes may also be equipped with a smart meter, such as when solar panels are installed on the home. In some locations, various devices in the home may be able to communicate with the smart meter and receive data directly related to not just the home, but also the power grid itself.

However, such data is limited and often does not provide enough insight to make decisions. For example, power supplied to the home may be provided by a source that utilizes various levels of carbon emissions; solar versus coal, etc. Additionally, data received from the power grid may be unreliable, such that hesitation may occur to execute decisions based off of that questionable data. Microgrid leads, smart meters, and devices within the home currently don't have a method of reacting to power being provided from a carbon heavy power source versus a relatively cleaner power source.

SUMMARY

Systems and methods for generating verifiable power line sustainability data in accordance with embodiments of the disclosure are disclosed. In many embodiments, a device includes a processor, a memory commutatively coupled to the processor, a communication port coupled with a second device, and a smart meter logic configured to execute within a first trusted environment and receive, through the communication port, power source data wherein the power source data comprises a plurality of measurements. Upon receiving, the smart meter logic can process the received power source data in numerous ways. In response to processing the data, it can be passed to one or more energy-consuming devices, wherein the power source data is formatted to allow the one or more energy-consuming devices to adjust their energy consumption in response to at least one metric within the power source data.

In some more embodiments, the received power source data is attested and the smart meter logic is further configured to determine if the attested power source data was received from a trusted source.

In still more embodiments, the trusted source is a verifiably known application executed within a second trusted execution environment.

In various embodiments, the at least one metric comprises a sustainability-related metric.

In supplementary embodiments, wherein the communication port is further configured to transmit electricity suitable for consumption by one or more energy-consuming devices.

In a number of embodiments, the smart meter logic is also configured to monitor energy consumption associated with a location. The smart meter logic may also generate sustainability data based on the monitored energy consumption and process it within a trusted execution environment. Finally, the smart meter logic can attest to the validity of the generated sustainability data and transmit the attested sustainability data to a microgrid lead.

In more embodiments, the attested power source data is received from a microgrid lead.

In additional embodiments, the power source data is attested by the microgrid lead through at least one confidential computing methods.

In further embodiments, the power source data includes at least a level of greenhouse gas mix.

In more embodiments, the energy-consuming devices adjust their energy consumption in response to the sustainability metric being above a predetermined threshold.

In still more embodiments, in response to the sustainability metric exceeding the predetermined threshold, the energy-consuming device reduces energy consumption.

In more additional embodiments, the reduction in energy consumption is a full stop of energy consumption until the sustainability metric falls below the predetermined threshold.

In yet more embodiments, the sustainability metric includes greenhouse gas mix.

In still further embodiments, a device includes a processor, a memory commutatively coupled to the processor, a communication port coupled with a plurality of node devices, and one or more power grid devices, and a microgrid lead logic. The microgrid lead logic is configured to generate a trusted execution environment, receive, through the communication port, verified global power source data, which is attested, aggregate the power source data over a predetermined interval, attest to the validity of the aggregated power source data, and pass, through the communication port, the attested power source data to the plurality of node devices.

In certain embodiments, the verified global power source data is received from the one or more power grid devices.

In still yet additional embodiments, communication between the device and the one or more power grid devices occurs through at least an interoperability protocol.

In still further embodiments again, the interoperability protocol is the OpenFMB protocol.

In yet additional embodiments, the power grid devices attest the global power source data by utilizing a secure application running in a trusted execution environment. In some embodiments, the predetermined interval is five minutes.

In some further embodiments, the plurality of node devices include one or more smart meters associated with a particular location.

In still yet more embodiments, microgrid lead attests to the validity of the power source data through one or more confidential computing methods.

In assorted embodiments, a method of processing end-to-end attested sustainability data includes establishing a secure connection between a power grid device, a microgrid lead device, a smart meter device, and one or more energy-consuming devices. The process can also include generating global power source data within a power grid device, aggregating the global power source data within a microgrid lead device over a predetermined amount of time, monitoring at least one energy-consuming device, generating sustainability data based on the monitored energy-consuming device, and attesting to the generated sustainability data.

In additional embodiments, the power grid device, microgrid lead device, smart meter device, and one or more energy-consuming devices utilize at least one confidential computational method.

In still more further embodiments, the attested sustainability data is utilized to verify compliance with one or more programs.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The description of the present disclosure will be more fully understood with reference to the following figures, which are presented as exemplary embodiments of the disclosure and should not be construed as a complete recitation of the scope of the disclosure, wherein:

FIG. 5 is a flowchart depicted a process for operating a microgrid lead suitable for providing verifiable power source data in accordance with an embodiment of the disclosure;

FIG. 6 is a flowchart depicting a process for operating a smart meter suitable for receiving verifiable power source data in accordance with an embodiment of the disclosure;

FIG. 7 is a flowchart depicting a process for providing end-to-end verifiable data between energy-consuming devices and a power grid in accordance with an embodiment of the disclosure;

Figure 1:
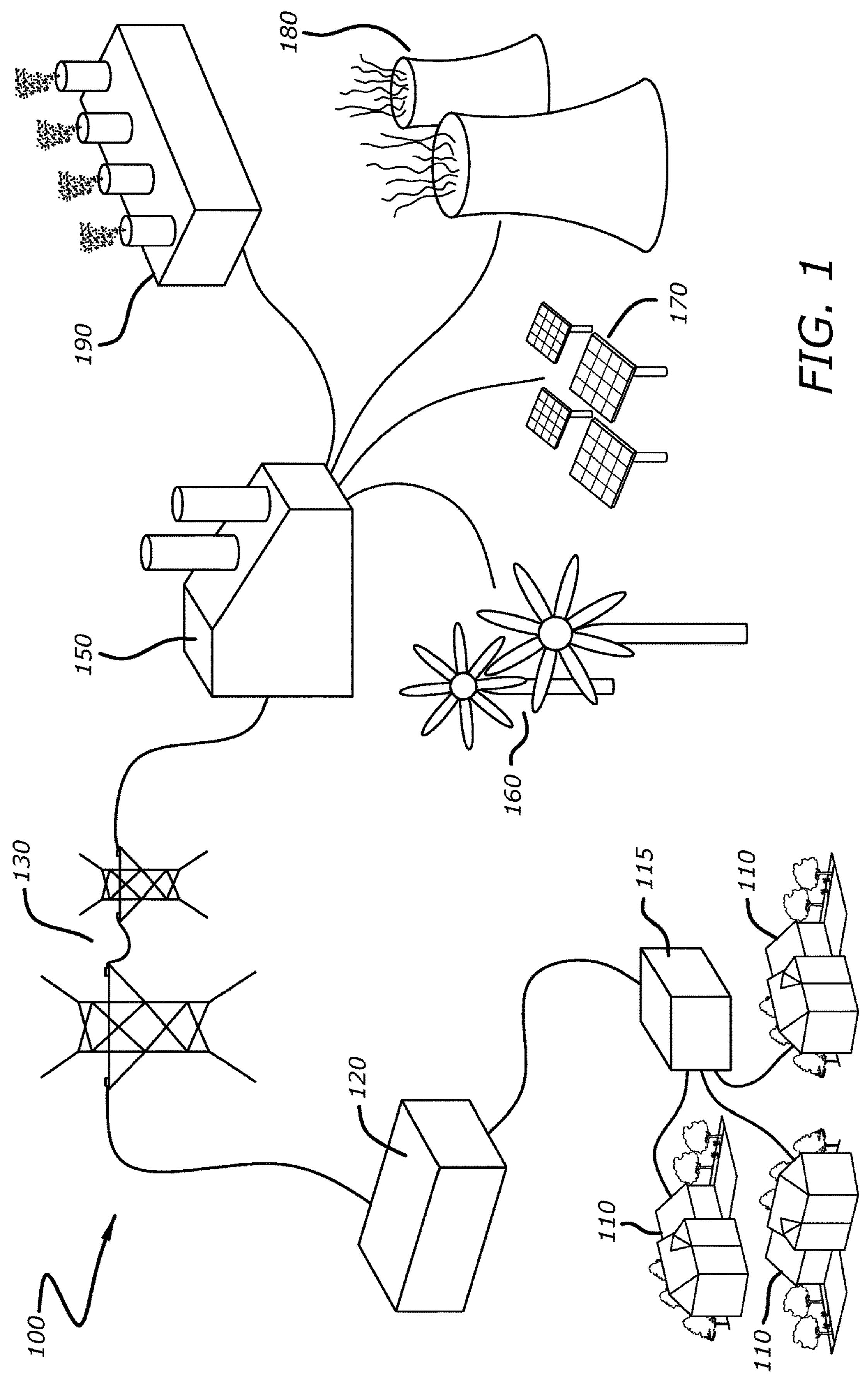
FIG. 1 is a conceptual diagram of a power grid system suitable for verified sustainability data transmission in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices, systems, and methods are discussed herein that generate verifiable sustainability data associated with power delivered over power lines within a power deliver grid. In various embodiments, the lead, such as a microgrid lead, can be assigned a new set of objectives. For example, the lead may receive notifications of all current inflows of power into a managed partition within the overall power grid. For each inflow, the lead will receive sustainability data, which may include specific sustainability metrics such as a carbon footprint of the power source providing the power, and/or a greenhouse gas mix metric from any source providing power. The greenhouse gas mix can be defined in a number of ways, including, but not limited to, the amount of greenhouse gas created per kilowatt hour produced. This can include, in some embodiments, electricity generated by solar even in residential sites.

Once the sustainability data is received, the lead can parse and transmit the data proportionally across all feeds into that partition. In certain embodiments, this may be done inline on the bus so that physical association with the right power feed can be done. In further embodiments, some identity signal could be electrically encoded on the power line, allowing such correlation. The lead can broadcast the resulting mix to all consumers of that portion of the subsection of the grid. With that information, many things become possible.

Other ways in which the sustainability data may be utilized include processing deferrable loads. By way of non-limiting example, dishwashers or electric vehicles could wait to use power until the carbon footprint or other pollution-related metric satisfies or otherwise is exceeding a predetermined threshold or condition/rule. In many embodiments, this could include deferrable loads on computers such as the downloading and execution of major OS upgrades, initiating battery backups based on the proper metric, operating an automated vacuum cleaner, charging a home batter, etc. The energy-consuming devices capable of processes these metrics may adjust their power, such as powering down to a lower power state, or shutting down their power consumption completely to a full stop until the predetermined threshold (such as a greenhouse gas mix) falls below the predetermined threshold again.

However, there may be certain incentives to motivate a bad actor to manipulate or otherwise attack the sustainability data being transmitted. In response, this data may be verified through the use of one or more confidential computing techniques. This may be necessary to limit the incentive of ingress power suppliers to spoof the sustainability metrics of adverse outcomes actually being produced.

Each advertisement or data transmission produced could be hardware signed and attested in order to be considered in the sustainability data calculation. This could allow for a verifiably trustworthy program, which is actually verifiably integrated into an upstream electric source to assert their current operational sustainability metrics to a lead within a power grid partition.

For example, a solar power source could have a score of zero when evaluating greenhouse gas emissions. It would also be possible to assert other metrics as well to account for other environmental considerations, from the greenhouse gases and other pollution used/created during the device production, to ozone producing chemicals, to water supply use, etc. All of these sustainability metrics could all be asserted as a percentage of introduced kWh.

To explain confidential computing, it should first be contrasted against classical computing. In classical computing, data exists in three states: in transit, at rest, and in use. Data traversing a network is "in transit," data in storage is "at rest," and data being process is "in use." Data is constantly being stored, consumed, and shared, including sensitive data such as credit card data, medical records. Cryptography and other security techniques are often deployed to provide both data confidentiality and integrity. However, protecting data in use has been harder to achieve until confidential computing arrived.

Confidential computing often achieves the protection of data in use by performing computation in a hardware-based attested Trusted Execution Environment (TEE). The TEE is often configured to assure data confidentiality, data integrity, and code integrity wherein unauthorized entities cannot add, remove, or alter code executing in the TEE. This means that even other applications running in a device/host cannot alter the code within the TEE. The TEE can be generated often by the use of a confidential computing processor and a confidential computing-compatible memory.

Finally, a TEE can be configured to provide evidence or measurements of its origin and current state, so that the evidence can be verified with another party and, programmatically or manually, it can decide whether to trust code running in the TEE. This attestation can often be signed by hardware that can be vouched in some way by the manufacturer such that a strong confidence can be made that the provided attested data was not made by malware or any other unauthorized parties.

In additional embodiments, confidential computing techniques could be utilized to verify the specific identity of the hardware chip which is being used to generate the measurement. It could also be possible to verify the identity of the software provider who wrote the software running on the chip, or that there is a mutually encrypted tunnel running between the chip and any secure producer measurement chips doing kWh tracking. In still further embodiments, confidential computing techniques could be utilized to verify the software-bill-of-materials which was used to generate the measurements or use a digital ledger from a blockchain system to agree on valid participants in the grid where there are power producers spanning independent owners/operators.

As will be discussed in more detail below, this data can be aggregated at the microlead grid level and delivered to smart meters attached to locations such as homes. These smart meters can then feed the verified sustainability data to various energy-consuming devices as outlined above. In many embodiments, this can be done in near-real-time in order to provide a stable input for the devices, which may be an aggregation of data over a predetermined interval or time or in response to an event such as, but not limited to, a request for updated sustainability data.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual diagram of a power grid system 100 suitable for verified sustainability data transmission in accordance with an embodiment of the disclosure is shown. In many embodiments, a power grid system 100 can comprise a plurality of elements such as, but not limited to, a central system location 150 which may often be operated by a power company or public utility. The central system location 150 can coordinate power that is generated from a variety of sources. These sources can have varying levels of carbon footprints, meaning that more carbon output/pollution is generated from one power source than another. For example, a coal power generating source 190 produces a lot of carbon output while a wind power source 160 produces a much lower amount. A power grid system 100 may also have power generated by sources such as, but not limited to, solar power sources 170 and a nuclear power source 180. Other power sources are contemplated such as geothermal, hydro-electric, etc., but the embodiment depicted in FIG. 1 is simplified to illustrate a concept relevant to the present disclosure.

The generated power is subsequently transferred over a plurality of transmission lines 130 or other equivalent means to a substation 120 that prepares the power for delivery to a plurality of locations for use. In the embodiment depicted in FIG. 1, the substation feeds into a local delivery hub or lead 115. The lead 115 can then distribute or feed through the power inflow to a plurality of location such as homes 110. In some embodiments, the homes 110 may be equipped with solar panels or other power generating devices that may also provide a power outflow back to the lead 115 and eventually back to the central system location 150. As will be disclosed below, the power grid system 100 can be configured to deliver power to homes 110 (and other locations as desired) in a verifiable way such that confidence about the sustainability data associated with the power source providing the power can be realized.

Although a specific embodiment for a power grid system 100 is described above with respect to FIG. 1, any of a variety of systems and/or processes may be utilized in accordance with embodiments of the disclosure. For example, a power grid may comprise a larger network of central system locations 150, power sources, or other elements. The elements depicted in FIG. 1 may also be interchangeable with other elements of FIGS. 2A-9 as required to realize a particularly desired embodiment. Examples of how communication may occur within a power grid system 100 are disclosed below.

Figures 2A, 2B:
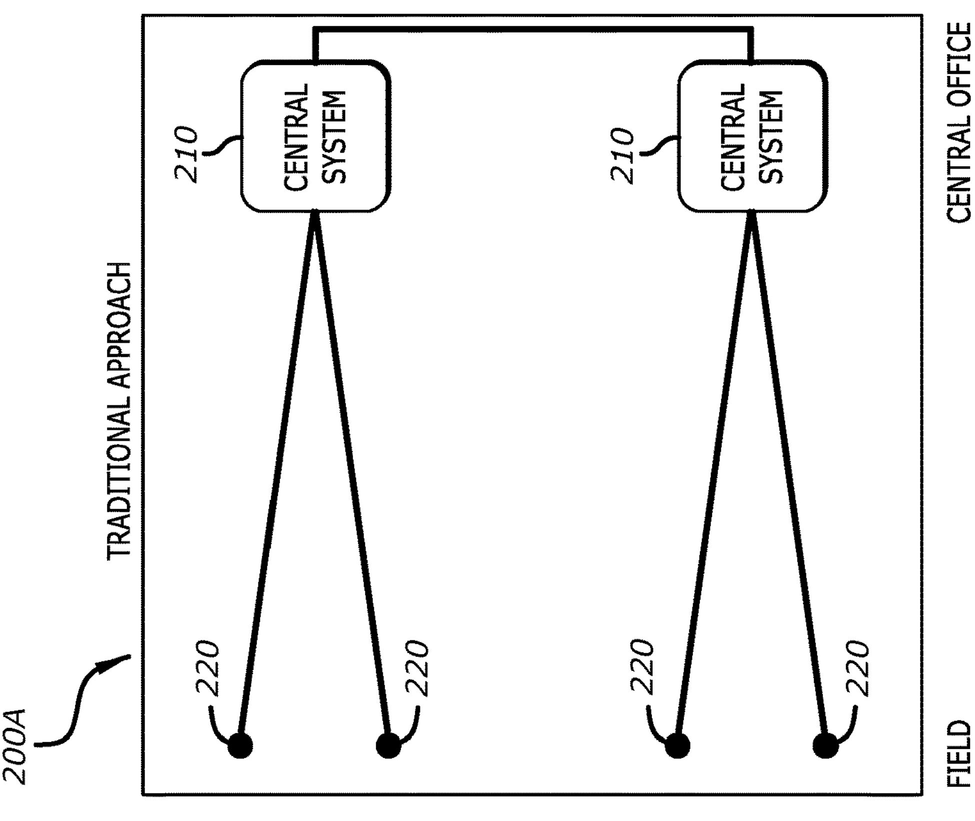
FIG. 2A is a conceptual diagram of a traditional power grid communication structure in accordance with an embodiment of the disclosure.
FIG. 2B is a conceptual diagram of a distributed intelligence power grid communication structure in accordance with an embodiment of the disclosure.

Referring to FIG. 2A, a conceptual diagram of a traditional power grid communication structure 200A in accordance with an embodiment of the disclosure is shown. Traditionally, power grid systems have limited communication channels. The embodiment depicted in FIG. 2A shows a power grid system with two central systems 210 that are in communication with each other. Each of the central systems 210 are in communication with field devices 220. The field devices 220 may be any downstream device such as, but not limited to, a substation, lead, location receiving power, etc.

When data is generated at the field devices 220 and needs to communicate that data with another field device attached to a different central system 210, the only method of communicating that data is to transmit the data upstream through the central systems 210 to the destination field device 220. This method of communication is inefficient as there may be many reasons why field devices 220 disposed downstream may want to communicate with each other without invoking the central systems 210. Additionally, this creates more transit time and locations which may suffer from data attacks or corruption. Thus, a more distributed method of communication was proposed, as disclosed below.

Referring to FIG. 2B, a conceptual diagram of a distributed intelligence power grid communication structure 200B in accordance with an embodiment of the disclosure is shown. The distributed intelligence power grid communication structure 200B can take the traditional approach of FIG. 2A and add a messaging system that can be operated by a distributed intelligence system 250. The distributed intelligence system 250 can be in communication with a plurality of distributed devices such as the microgrid lead devices 270 that are placed out in the field. In some instances, the microgrid lead may be deployed in conjunction with or on a previously deployed field device 220.

Each of the microgrid lead devices 270 may be in communication with each other by having the ability send messages on a separate channel using a particular interoperability protocol. In the embodiment depicted in FIG. 2B, the network utilizes peer-to-peer OpenFMB communications 260 between each of the microgrid lead devices 270. However, in some embodiments, a different communication protocol may be used. These interconnected communication links provided by the interoperability protocol can allow a first field device 220 to transmit to a second field device 220 through their microgrid leads 270 using the peer-to-peer OpenFMB communications 260, thus bypassing the need to transmit data to and through the central systems 210. Example of how these structures can be deployed in distributed intelligence power grid communication structures 200B is shown in more detail below.

As those skilled in the art will recognize, OpenFMB is designed to provide a standardized approach for integrating various systems and devices in the energy sector, including distributed energy resources (DERs), such as solar panels, wind turbines, energy storage systems, and electric vehicles. By using a common messaging format, OpenFMB enables these devices to communicate and exchange data in real-time, allowing for more efficient and effective energy management. OpenFMB is based on an open architecture that supports multiple communication protocols and data models, making it easier for different vendors and organizations to integrate their systems and devices. It is also designed to be scalable and adaptable, allowing for future expansion and evolution of the energy system.

Figure 3:
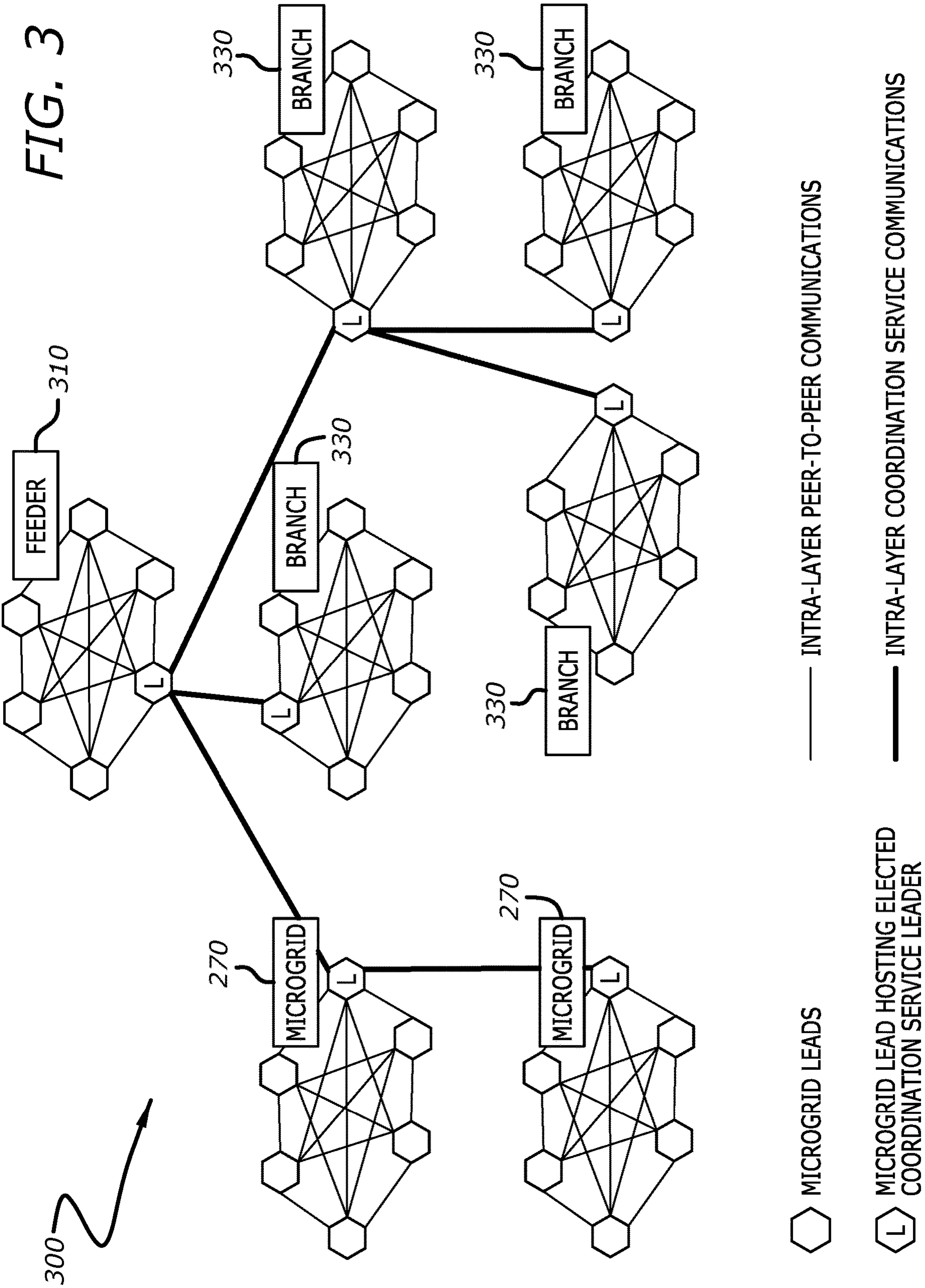
FIG. 3 is a conceptual illustration of a communication topology of a partition with a power grid system in accordance with an embodiment of the disclosure.

Referring to FIG. 3, a conceptual illustration of a communication topology 300 of a partition with a power grid system in accordance with an embodiment of the disclosure is shown. In various embodiments, the system of communication of power grid devices may include a feeder device 310 and microgrid lead device 270 in series. As seen in the embodiment depicted in FIG. 3, a cluster of microgrid lead devices 270 can be a feeder device 310 (shown in FIG. 3 as a "feeder") to another downstream series of clusters within the communication structure via a set of branches 330 interconnecting them. The downstream clusters may be comprised a plurality of microgrids in communication with each other. Each microgrid lead device 270 (or nodes) within a cluster can elect a coordination "leader" to communicate with higher and lower-level power grid segment leaders. This structure can provide scalability through distributed intelligence, increase performance through local decision making, security through segmentation of information flow, and resilience through potential self-sufficiency. As seen in more detail below, this structure can also be utilized to provide secure end-to-end verifiable sustainability data as well as provide a method of confidently making decisions at the energy-consuming device level in response to one or more attested sustainability metrics provided from upstream devices through the use of one or more confidential computing techniques.

Although specific embodiments for distributing communication within power grid systems are described above with respect to FIGS. 2A-3, any of a variety of systems and/or processes may be utilized in accordance with embodiments of the disclosure. For example, a power grid may utilize an entirely different structure of distributed communication channels while still providing for the ability to confidently transmit power source sustainability data. The elements depicted in FIGS. 2A-3 may also be interchangeable with other elements of FIGS. 1 and 4-9 as required to realize a particularly desired embodiment. A discussion of how verifiable transmission of sustainability data related to power sources can be processed down to the energy-consuming device level are disclosed below.

Figure 4:
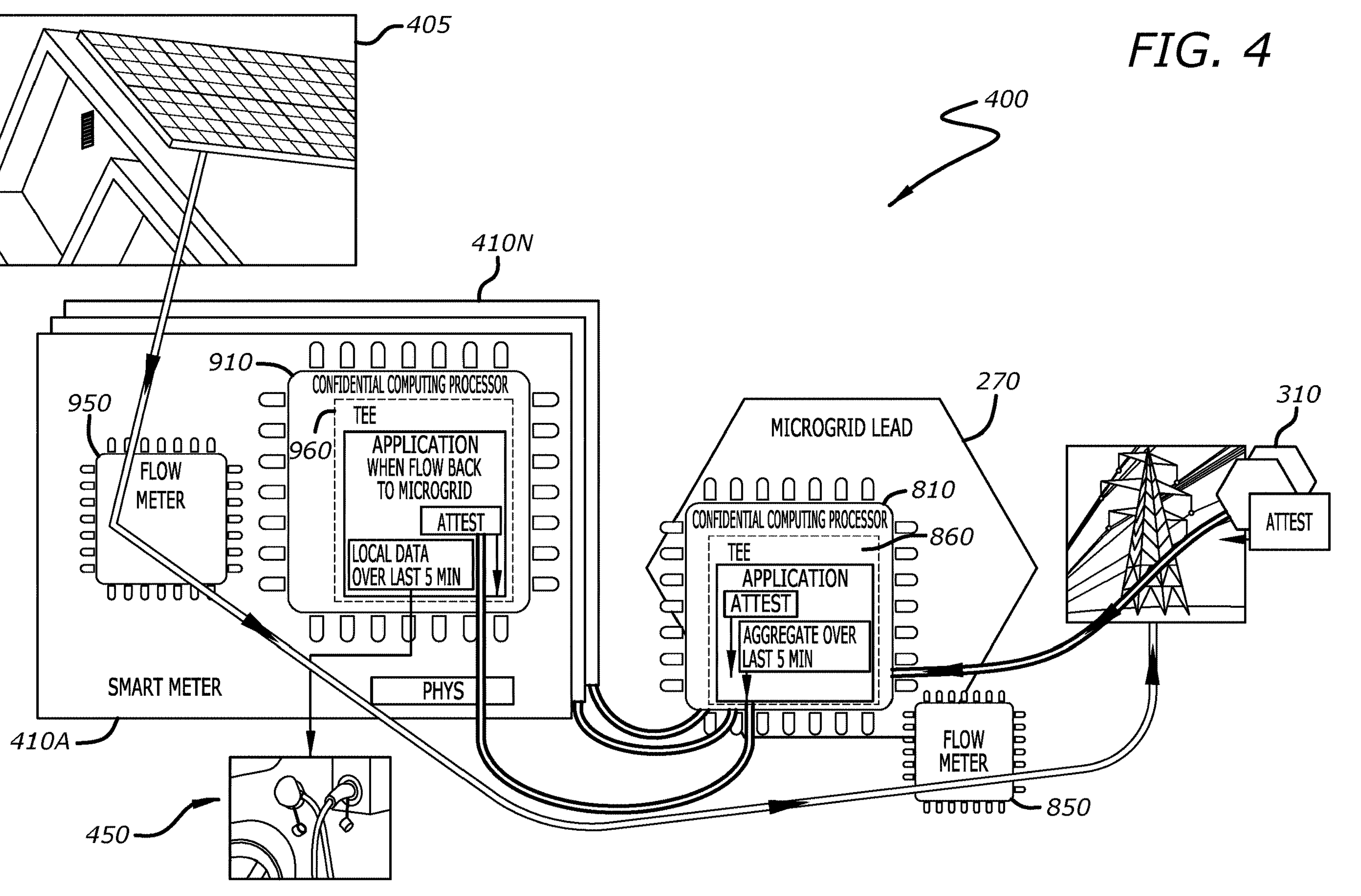
FIG. 4 is a conceptual schematic diagram of a verified communication system within a power grid in accordance with an embodiment of the disclosure.

Referring to FIG. 4, a conceptual schematic diagram of a verified communication system 400 within a power grid in accordance with an embodiment of the disclosure is shown. In many embodiments, a home 405 may be configured with a smart meter 410A within their electrical system. The smart meter 410A, may be in communication with a microgrid lead device 270 (shown as a "microgrid lead") which can be set up to serve a plurality of homes within a neighborhood, being connected to a plurality of smart meters 410A-410N. The microgrid lead device 270 can receive power and data from the power grid, including feeder devices 310 within a communication network.

In various embodiments, the microgrid lead device 270 may include a confidential computing processor 810. The embodiment depicted in FIG. 4 shows a trusted execution environment 860 (shown as TEE), that is conceptually shown to be executed by, and within, the confidential computing processor 810. As those skilled in the art will recognize, the trusted execution environment 860 can operate an application that can take actions such as attesting to data that it generates prior to transmission to the plurality of smart meters 410A-410N. The data that the microgrid lead device 270 may attest to can vary based on the desired application.

In a number of embodiments, the microgrid lead device 270 can receive data from the feeder devices 310 over a period of time. This received data can be aggregated prior to transmission to the smart meters 410A-410N. In the embodiment depicted in FIG. 4, the microgrid lead aggregates the data over the last five minutes, although any timing pattern can be utilized as appropriate to the requirements of the specific applications of embodiments in the present disclosure. The data processed by the microgrid lead device 270 within the trusted execution environment 860 can include sustainability data, which can be comprised of any variety of sustainability metrics, statistics, or other information that can be used to effect one or more decisions. For example, as disclosed above within the discussion of FIG. 1, the carbon footprint of various power sources can vary. The sustainability data may, in certain embodiments, include the real-time or near-real-time carbon footprint or greenhouse gas mix of the power being provided. Furthermore, because of the nature of confidential computing, the microgrid lead can receive attested data from the feeder devices 310 such as verified global power source data which can include the source of power being received by the microgrid lead device 270, and further attest to that data before transmitting it to the plurality of smart meters 410A-410N.

In further embodiments, the smart meters 410A-410N can provide this attested data to one or more energy-consuming devices 450. Because of the chain of confidential computing systems from the feeder devices 310 to the smart meters 410A-410N, the energy-consuming device 450 can confidently make determinations based on the received sustainability data. For example, as depicted in FIG. 4, an electric car charger may have a setting available that limits charging until the power being provided is from a carbon neutral or relatively lower carbon footprint. However, it is also contemplated that other metrics may be utilized that reflect the same intent but examine different statistics, such as greenhouse gas mix, carbon gas emission estimates, or power source location, etc. In this way, consumer-level devices can be configured to make automatic decisions based on the attested methods on which the receive power was generated.

In still more embodiments, the smart meters 410A-410N are also equipped with a confidential computing processor 910 which can also generate a trusted execution environment 960 (shown as TEE in FIG. 4). Those skilled in the art will again recognize that the trusted execution environment 960 established by the confidential computing processor 910 can execute an application, such as in the embodiment of FIG. 4, an application for when data is to flow back to the microgrid lead device 270. The application can gather data from various energy-consuming devices 450 which may be useful for processing by the microgrid lead device 270 or the power company central system in general. The smart meters 410A-410N may also include data related to power generation for those homes 405 that include solar panels or the like. This power generation data can be captured from a flow meter 950. The subsequent data can be attested to within the smart meters 410A-410N prior to being transmitted back to the microgrid lead device 270. The microgrid lead may also have a flow meter 850 providing data which can be used to verify power usage and determine which locations within the local partition are utilizing the most power, etc.

Although the embodiment in FIG. 4 limits the backflow of data to the microgrid lead device 270, it is contemplated that additional embodiments can include a further upstream of data back to the feeder devices 310 and even to the central systems. In this way, if all locations within the upstream and downstream communication system of the power grid are utilizing confidential computing methods, then the result is a system of end-to-end communication of verifiable sustainability data which can confidently relied upon to make decisions within the power grid, providing the ability to further increase overall power grid efficiency and decrease pollution.

Although a specific embodiment for a verified communication system 400 within a power grid is described above with respect to FIG. 4, any of a variety of systems and/or processes may be utilized in accordance with embodiments of the disclosure. For example, data may be sent wirelessly or may include control commands such that the decision to change the behavior of energy-consuming devices occur within the smart meters 410A-410N or higher. In this way, energy-consuming devices that do not have the ability to make power-related decisions can still be controlled based on received verifiable sustainability data. In a non-limiting example, a hot-water heater with no decision-making capabilities may have its power turned off at the smart meter based on a decision the smart meter made in reaction to the received verifiable sustainability data. The elements depicted in FIG. 4 may also be interchangeable with other elements of FIGS. 1-3 and 5-9 as required to realize a particularly desired embodiment. An example process of how to operate a microgrid lead is disclosed below.

Referring to FIG. 5, a flowchart depicted a process 500 for operating a microgrid lead suitable for providing verifiable power source data in accordance with an embodiment of the disclosure is shown. In many embodiments the process 500 can begin execution within a trusted execution environment (block 510). As discussed above, a trusted execution environment can be made through the use of one or more confidential computing methods. Once generated, a variety of secure applications can begin to operate and process data. As those skilled in the art will recognize, the trusted execution environment can be generated by executing within a secure hardware environment. However, additional embodiments may be virtualized and generate the necessary components and elements for a trusted execution environment.

The process 500 can subsequently receive verified global power source data from a power grid device (block 520). In a number of embodiments, verified global power source data can relate to data associated with various sources of power received from the power grid to the microgrid lead. Often, the global power source data can include sustainability data. In more embodiments, the received verified global power source data has been attested to from within another confidential computing environment.

This data may be received by the microgrid lead over a period of time. The process 500 can aggregate the received global power source data over a predetermined interval (block 530). The embodiment depicted in FIG. 4 aggregated over five minutes, but any interval is sufficient to meet the needs of the desired application. Often, there is a desire to aggregate the data to meet a real-time or near-real-time need for energy-consuming devices to make decisions about power usage.

Upon aggregation, the process 500 can attest to the validity of the aggregated power source data (block 540). The attestation is valid since the application is operating within a trusted execution environment. Thus, the receiver of this data can be relatively certain that it was not forged or otherwise manipulated by an outside actor or attack.

When the attesting occurs, the process 500 can pass the attested power source data to a plurality of node devices (block 550). In various embodiments, the node devices are smart meters, such as those depicted in FIG. 4, however other node devices are contemplated. Passing of the data may be done inline or can be transmitted through other means such as wirelessly.

In certain optional embodiments, the process 500 can receive attested sustainability data from a node device (block 560). For example, a smart meter on a home may gather data to power usage within the home and transmit that data back to the microgrid lead. In further embodiments, the received data may include results of the received data or a list of decisions made based on the transmitted data.

Referring to FIG. 6, a flowchart depicting a process 600 for operating a smart meter suitable for receiving verifiable power source data in accordance with an embodiment of the disclosure is shown. In certain optional embodiments, the process 600 can generate a trusted execution environment (block 610). In these embodiments, the processing, gathering, and subsequent transmission of data is done within this trusted execution environment. As stated above, the trusted execution environment can be generated by executing within a secure hardware environment but may also be virtualized and have one or more components and elements generated virtually.

In many embodiments, the process 600 can receive power source data from a microgrid lead device (block 620). In a number of embodiments, the power source data can comprise a plurality of metrics. In various embodiments, the plurality of metrics can include one or more sustainability metrics. In some embodiments, the power source data can be attested. However, in more embodiments, the process 600 may take the received power source data and conduct at least one further process (block 625), such as, but not limited to, parsing the power source data. In one non-limiting example, the process 600 can receive unattested power source data and process it such that it can be attested when received by other devices downstream. However, it is contemplated that other processing, augmenting, filtering, and the like can be done to the received power source data.

Subsequently, the process 600 can pass the received power source data to one or more energy-consuming devices (block 630). As discussed above, the power source data can include sustainability data which itself may include data regarding the sustainability of the power source that generated the current power such as, but not limited to, carbon footprint, greenhouse gas mix, or type of source. This scan result in the process 600 adjusting the energy consumption in one or more energy-consuming devices in response to the passed power source data (block 640). In certain embodiments, the adjustment of power consumption may include a reduction in energy consumption, up to and including a full stop. Often, these decisions are made within the devices themselves, however, other devices may rely on the smart meter to withdraw access to power or to indicate to a smart power panel or other access junction to remove power from the device.

In some embodiments, the process 600 may end, however other optional embodiments may further monitor energy consumption within the location (block 650). After monitoring this usage, the process 600 may optionally generate sustainability data based on the monitored energy consumption (block 660). In additional embodiments, the data generated may go beyond just sustainability and may include decisions, actions, or other states from the energy-consuming devices themselves.

The generated data may then be, in some embodiments, attested to its validity (block 670). This can be done again when the process 600 begins with the generation of a trusted execution environment. Upon attesting to the generated data, the process 600 can transmit the attested sustainability data to a microgrid lead device (block 680). Similar to the microgrid lead, this data may be transmitted in real-time or near-real-time upon aggregation of the data. In further embodiments, the data may be transmitted at predetermined intervals or at a specific time or in response to a specific event, such as a request form the microgrid lead.

Referring to FIG. 7, a flowchart depicting a process 700 for providing end-to-end verifiable data between energy-consuming devices and a power grid in accordance with an embodiment of the disclosure is shown. In many embodiments, the process 700 can establish a connection between an energy-consuming device, a smart meter device, and a microgrid device, wherein each device is processing data within a trusted execution environment (block 710). As those skilled in the art will recognize, this setup can provide a transmission channel of attested and verifiable data between the devices. In additional embodiments, the process 700 may also include a power grid device within that chain of secure communications.

In a number of embodiments, the process 700 can monitor the power usage of the energy-consuming device (block 720). The process 700 can then further generate sustainability data based on the monitored usage data (block 730). Often, as described above with reference to FIG. 6, this can be accomplished within the smart meter. The generated data can then have its validity attested to (block 740). As shown in FIG. 7, sustainability data can be attested to, however other types of data are contemplated.

In further embodiments, the process 700 can transmit the attested sustainability data from the smart meter to the microgrid lead (block 750). Upon receipt of that attested data, the process 700 can utilize it to verify that the energy-consuming device is conforming to or otherwise in compliance with one or more programs (block 760). For example, if a homeowner commits to utilizing less power during certain hours, or to not run an appliance during certain times, the data sent to the microgrid lead can verify that pledge. Because the data has been attested to, the operator of the program can be confident that the data has not been manipulated by an outside actor or attack. It is contemplated that other programs, rules, and/or pledges can be verified in this manner.

Figure 8:
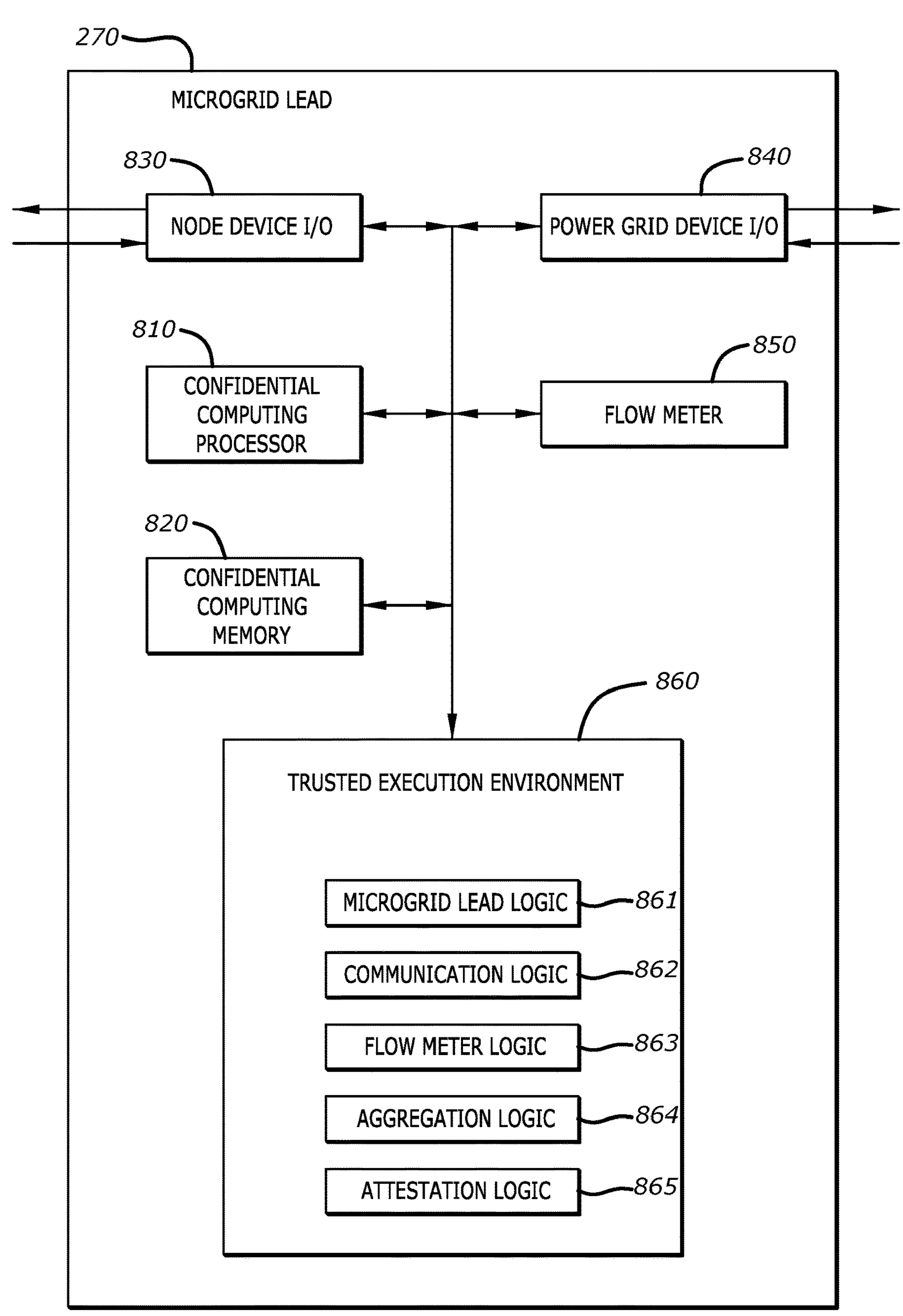
FIG. 8 is a block diagram of a microgrid lead suitable for providing verified power grid communications in accordance with an embodiment of the disclosure.

Referring to FIG. 8, a block diagram of a microgrid lead device 270 suitable for providing verified power grid communications in accordance with an embodiment of the disclosure is shown. In many embodiments, the microgrid lead device 270 may comprise a confidential computing processor 810 and a confidential computing memory 820 suitable for generating a trusted execution environment 860. In additional embodiments, the microgrid lead device 270 may also comprise a series of communication ports as inputs and outputs. In some embodiments, the communication port can be configured to transmit electricity suitable for consumption by one or more energy-consuming devices, such as, but not limited to power over ethernet (PoE). In the embodiment depicted in FIG. 8, the microgrid lead device 270 includes a node device I/O 830 for communicating with other nodes on the network along with smart meters. The embodiment also comprises a power grid I/O 840 which can be configured to transmit and receive data from other power grid devices including, but not limited to, central systems, etc. Finally, in more embodiments, the microgrid lead device 270 may include a flow meter 850 which can provide data related to the power inflow and/or outflow.

Within the trusted execution environment 860, a number of logics may be executed and/or reside. Within the embodiment depicted in FIG. 8, the microgrid lead device 270 comprises a microgrid lead logic 861, a communication logic 862, a flow meter logic 863, an aggregation logic 864, and an attestation logic 865. Those skilled in the art will recognize that these logics can be grouped, separated, or otherwise combined in any various manor as needed by the desired application. Additionally, various logics may be executed remotely or within an external trust execution environment.

In a number of embodiments, the microgrid lead logic 861 can operate all of the functions necessary to operate the microgrid lead device 270. In certain embodiments, this may include generation of the trusted execution environment 860. Other heuristics, rules, or other thresholds that may need to be tracked during normal operation can also be tracked and determined within the microgrid lead logic 861.

In many embodiments, the communication logic 862 can facilitate operation of the node device I/O 830 and/or the power grid device I/O 840, etc. This can allow for data transmission and communication between power grid devices, smart meters, or any other types of nodes within the power grid communication network. In some embodiments, the communication may be wireless or travel across a non-standard protocol, which may be facilitated by the communication logic 862.

In various embodiments, the flow meter logic 863 may provide for operation of a flow meter associated with the microgrid lead device 270. In some embodiments, the flow meter may be integrated within the microgrid lead device 270, but in further embodiments, the flow meter may be remote and only provide data through a communication line, which the flow meter logic 863 may receive and parse to determine the relevant data for processing. The flow meter logic 863 may also format and/or present data for attestation by the attestation logic 865.

In additional embodiments, the aggregation logic 864 can gather data received by various external devices over a period of time or another unit. In some embodiments, the microgrid lead device 270 receives data from a power grid device which includes power grid data, which may itself include sustainability data. These data may be presented as single instantaneous measurements. Subsequently, the aggregation logic 864 may compile and aggregate a series of these data together to form an aggregated data. This aggregated data can be formatted as sustainability data which can include specific metrics such as the current power source type, the carbon footprint, greenhouse gas mix, and the like. The aggregation logic 864 can provide a more stable source of input through aggregating this data. In further embodiments, the aggregation can be done periodically, such as every few minutes, or in response to an event or request.

In still further embodiments, the attestation logic 865 can verify that no aspect of the confidential computing environment has been violated within the microgrid lead device 270. In response to no violations, the attestation logic 865 may package data or transmit some verification signal that indicates that the data being presented is verified as authentic. In more embodiments, the attestation logic 865 can advertise this status to multiple devices connected across a network such that each data being transmitted isn't associated with a specific attestation. In even more embodiments, the attestation logic 865 may receive data which can be verified as attested and authentic from the source.

Although a specific embodiment for a microgrid lead device 270 is described above with respect to FIG. 8, any of a variety of systems and/or processes may be utilized in accordance with embodiments of the disclosure. For example, microgrid leads may be integrated within node devices, thus negating the need for node device I/O 830, etc. The elements depicted in FIG. 8 may also be interchangeable with other elements of FIGS. 1-7 and 9 as required to realize a particularly desired embodiment. An example embodiment of a smart meter is disclosed below.

Figure 9:
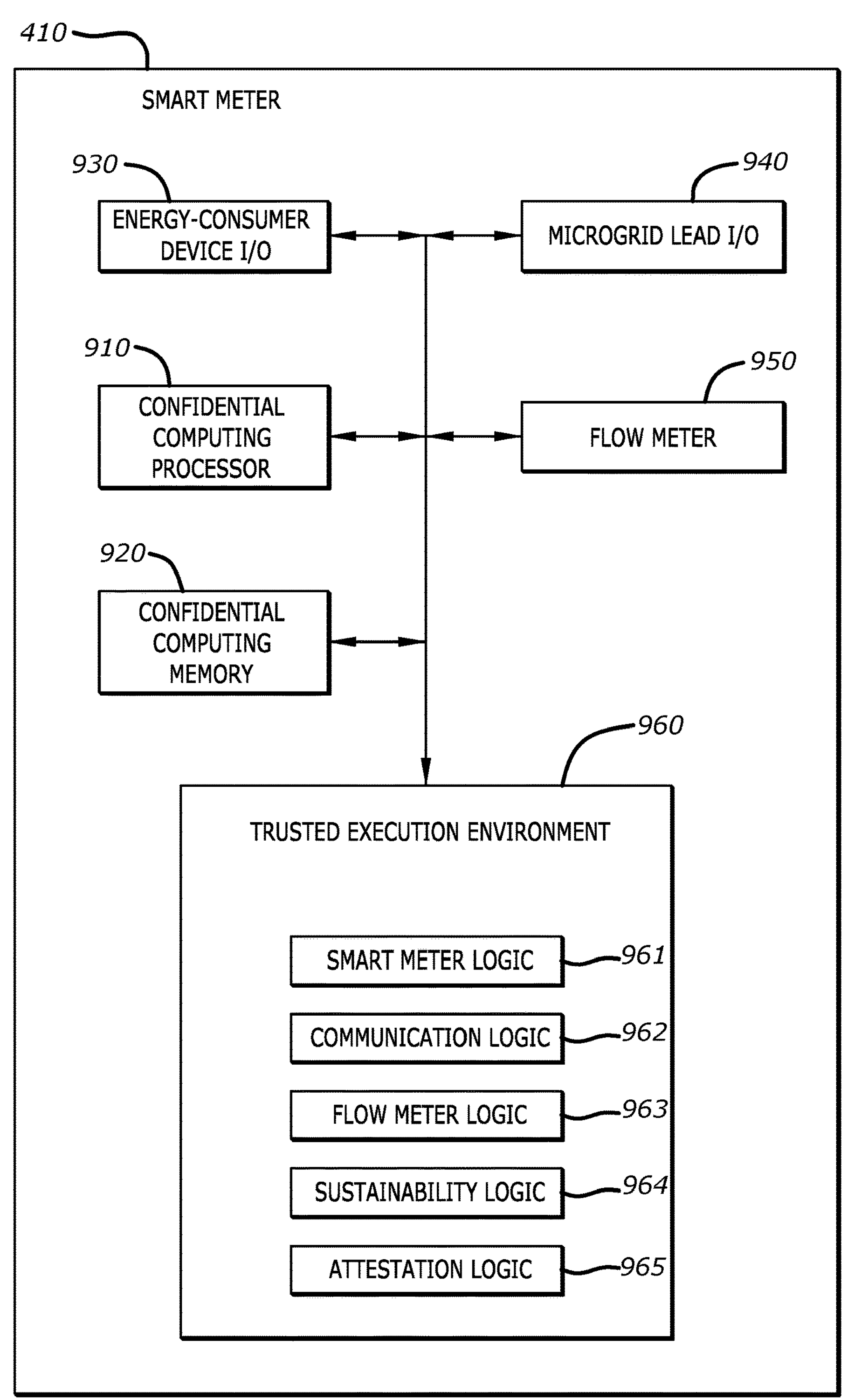
FIG. 9 is a block diagram of a smart meter suitable for receiving and processing verified power grid communications in accordance with an embodiment of the disclosure.

Referring to FIG. 9, a block diagram of a smart meter 410 suitable for receiving and processing verified power grid communications in accordance with an embodiment of the disclosure is shown. In many embodiments, the smart meter 410 may comprise a confidential computing processor 910 and a confidential computing memory 920 suitable for generating a trusted execution environment 960. In additional embodiments, the smart meter 410 may also comprise a series of communication ports as inputs and outputs. In the embodiment depicted in FIG. 9, the smart meter 410 includes an energy-consuming device I/O 930 for communicating with various energy-consuming devices within the location. For example, a home may have an electric car charger, a dishwasher, or other smart appliance. The embodiment also comprises a microgrid lead I/O 940 which can be configured to transmit and receive data from other power grid devices including, but not limited to, microgrid leads, etc. Finally, in more embodiments, the smart meter 410 may include a flow meter 950 which can provide data related to the power inflow and/or outflow.

Within the trusted execution environment 960, a number of logics may be executed and/or reside. Within the embodiment depicted in FIG. 9, the smart meter 410 comprises a smart meter logic 961, a communication logic 962, a flow meter logic 963, a sustainability logic 964, and an attestation logic 965. Those skilled in the art will recognize that these logics can be grouped, separated, or otherwise combined in any various manor as needed by the desired application. Additionally, various logics may be executed remotely or within an external trust execution environment.

In a number of embodiments, the smart meter logic 961 can execute all of the functions necessary to operate the smart meter 410. In certain embodiments, this may include generation of the trusted execution environment 960. Other heuristics, rules, or other thresholds that may need to be tracked during normal operation can also be tracked and determined within the smart meter logic 961. In additional embodiments, the smart meter logic can be configured to determine if some received attested power source data was received from a trusted source. This could be done by communicating with an external transmitting device or can be accomplished by examining the format of some portion of the data. However, in many embodiments, the trusted source is a verifiably known application executed within a second trusted execution environment.

In many embodiments, the communication logic 962 can facilitate operation of the energy-consuming device I/O 930 and/or the microgrid lead I/O 940, etc. This can allow for data transmission and communication between energy-consuming devices, microgrid leads, additional power grid devices, other smart meters, or any other types of nodes within the power grid communication network. In some embodiments, the communication may be wireless or travel across a non-standard protocol, which may be facilitated by the communication logic 962.

In various embodiments, the flow meter logic 963 may provide for operation of a flow meter associated with the smart meter 410. In some embodiments, the flow meter may be integrated within the smart meter 410, but in further embodiments, the flow meter may be remote and only provide data through a communication line, which the flow meter logic 963 may receive and parse to determine the relevant data for processing. The flow meter logic 963 may also format and/or present data for attestation by the attestation logic 965.

In additional embodiments, the sustainability logic 964 can monitor and parse received power source data for sustainability data, such as sustainability metrics. As discussed above, sustainability metrics can include a variety of metrics related to pollution, or energy savings. In various embodiments, the sustainability metrics may relate to the type of power source that provided the power being transmitted or used. For example, the sustainability data may include metrics related to the overall carbon footprint of the energy source, its greenhouse gas mix, and/or other related types of data. In response, the sustainability logic 964 can be configured to parse, format, and/or present this data to one or more energy-consuming devices that are equipped to receive it for the purpose of making decisions related to energy use. In this way, the sustainability logic 964 can facilitate additional energy savings at the consumer device level. In further embodiments, the sustainability logic 964 can gather data related to energy usage at the consumer device level and format it for transmission back to a microgrid lead or other power grid device.

In still further embodiments, the attestation logic 965 can verify that no aspect of the confidential computing environment has been violated within the smart meter 410. In response to no violations, the attestation logic 865 may package data or transmit some verification signal that indicates that the data being presented is verified as authentic. In more embodiments, the attestation logic 865 can advertise this status to multiple devices connected across a network such that each data being transmitted isn't associated with a specific attestation. In even more embodiments, the attestation logic 865 may receive data which can be verified as attested and authentic from the source.

Although a specific embodiment for a smart meter 410 is described above with respect to FIG. 9, any of a variety of systems and/or processes may be utilized in accordance with embodiments of the disclosure. For example, the smart meter may be integrated with a smart panel or other node device such that energy usage decisions can be made directly at the smart meter without the need for transfer to an energy-consuming device. The elements depicted in FIG. 9 may also be interchangeable with other elements of FIGS. 1-8 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:

a processor;

a memory communicatively coupled to the processor;

a communication port coupled with a second device; and a smart meter logic configured to:

monitor energy consumption associated with a location;

generate sustainability data based on the monitored energy consumption, wherein the sustainability data is processed within the first trusted execution environment;

execute within a first hardware-based trusted execution environment;

receive, through the communication port, attested power source data wherein the power source data comprises a plurality of metrics;

process the received power source data; and pass the processed power source data to one or more energy-consuming devices, wherein the power source data is formatted to allow the one or more energy consuming devices to manage a deferable load by adjusting their energy consumption in response to at least one metric within the power source data.

2. The device of claim 1, wherein:

the smart meter logic is further configured to determine if the attested power source data was received from a trusted source.

3. The device of claim 2, wherein the trusted source is a verifiably known application executed within a second trusted execution environment.

4. The device of claim 1, wherein the communication port is further configured to transmit electricity suitable for consumption by one or more energy-consuming devices.

5. The device of claim 1, wherein the smart meter logic is further configured to:

attest to a validity of the generated sustainability data; and transmit the attested sustainability data to a microgrid lead device.

6. The device of claim 1, wherein the at least one metric comprises at least one sustainability metric.

7. The device of claim 6, wherein the one or more energy-consuming devices adjust their energy consumption in response to the at least one sustainability metric being above a predetermined threshold.

8. The device of claim 7, wherein, in response to the at least one sustainability metric exceeding the predetermined threshold, a reduction of energy consumption within the one or more energy-consuming devices occurs.

9. The device of claim 8, wherein the reduction in energy consumption is a full stop of energy consumption until the at least one sustainability metric falls below the predetermined threshold.

10. The device of claim 8, wherein the at least one sustainability metric comprises a greenhouse gas mix.

11. The device of claim 8, wherein the at least one sustainability metric comprises a power source carbon footprint.

12. A device comprising:

a processor;

a memory communicatively coupled to the processor;

a communication port coupled with:

a plurality of node devices;

a smart meter device configured to:

monitor energy consumption associated with a location; and generate sustainability data based on the monitored energy consumption;

one or more power grid devices; and a microgrid lead logic configured to:

generate a hardware-based trusted execution environment, wherein the sustainability data is processed within the trusted execution environment;

receive, through the communication port, verified global power source data, wherein the verified global power source data is attested;

aggregate the verified global power source data over a predetermined interval;

attest to a validity of the verified aggregated power source data; and pass, through the communication port, the attested power source data to the plurality of node devices wherein the attested power source data is formatted to allow one or more energy-consuming devices to manage a deferable load.

13. The device of claim 12, wherein the verified global power source data is received from the one or more power grid devices.

14. The device of claim 12, wherein communication between the device and the one or more power grid devices occurs through at least an interoperability protocol.

15. The device of claim 14, wherein, the interoperability protocol is OpenFMB protocol.

16. The device of claim 12, wherein the one or more power grid devices attest the verified global power source data by utilizing a secure application running in a trusted execution environment.

17. The device of claim 12, wherein the plurality of node devices comprise one or more smart meters associated with a particular location.

18. A method of processing end-to-end attested sustainability data, comprising:

establishing a secure connection between:

a power grid device;

a microgrid lead device;

a smart meter device configured to monitor energy consumption associated with a location; and one or more energy-consuming devices;

generating global power source data within a power grid device;

aggregating the global power source data within a microgrid lead device over a predetermined amount of time;

passing the aggregated global power source data to the one or more energy-consuming devices to manage a deferable load;

monitoring at least one energy-consuming device;

generating sustainability data based on the monitored at least one energy-consuming device, wherein the sustainability data is processed within a trusted execution environment; and attesting, within the hardware-based trusted execution environment, to the generated sustainability data.

19. The method of claim 18, wherein the power grid device, microgrid lead device, smart meter device, and one or more energy-consuming devices utilize at least one confidential computational method.

20. The method of claim 19, wherein the attested sustainability data is utilized to verify compliance with one or more programs.

* * * * *